United States Patent

Eppelein

(10) Patent No.: US 9,919,742 B2
(45) Date of Patent: Mar. 20, 2018

(54) VEHICLE BODY HAVING AN UNDERBODY STRUCTURE AND AN AUXILIARY FRAME FASTENED THERETO

(71) Applicant: Bayerische Motoren Werke Aktiengesellschaft, Munich (DE)

(72) Inventor: Ralph Eppelein, Neufahrn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/072,739

(22) Filed: Mar. 17, 2016

(65) Prior Publication Data

US 2016/0251032 A1 Sep. 1, 2016

Related U.S. Application Data

(63) Continuation of application No. PCT/EP2014/068260, filed on Aug. 28, 2014.

(30) Foreign Application Priority Data

Sep. 18, 2013 (DE) .................. 10 2013 218 725

(51) Int. Cl.
 *B62D 21/11* (2006.01)
 *B62D 27/02* (2006.01)
 (Continued)

(52) U.S. Cl.
 CPC .............. *B62D 21/11* (2013.01); *B60R 13/08* (2013.01); *B62D 27/026* (2013.01); *B62D 29/041* (2013.01)

(58) Field of Classification Search
 CPC ....... B62D 24/00; B62D 29/041; B62D 21/11
 (Continued)

(56) References Cited

U.S. PATENT DOCUMENTS

2002/0174954 A1  11/2002  Busseuil et al.
2004/0046381 A1  3/2004  Yoshida et al.
 (Continued)

FOREIGN PATENT DOCUMENTS

CN  1488542 A  4/2004
CN  1964861 A  5/2007
 (Continued)

OTHER PUBLICATIONS

Chinese Office Action issued in counterpart Chinese Application No. 201480044127.1 dated Dec. 20, 2016 with English translation (12 pages).

(Continued)

*Primary Examiner* — Pinel E Romain
(74) *Attorney, Agent, or Firm* — Crowell & Moring LLP

(57) ABSTRACT

A vehicle body has an underbody structure and an auxiliary frame fastened thereto, which supports components of a wheel axis of the vehicle. The auxiliary frame is connected to the underbody structure without interposition of elastomer bearings or the like by use of several adhesive beads. The adhesive beads are configured not only with regard to a connection that meets mechanical requirements, but in particular with regard to the thickness the adhesive beads are also configured for acoustic insulation. The auxiliary frame is additionally supported on a securing structure provided below the auxiliary frame with the interposition of an acoustic insulation layer. The securing structure is connected to the underbody structure in a force-fit or material fit manner. In the receiving area of the auxiliary frame, the underbody structure can be configured with a trough-shape having lead-in chamfers for the auxiliary frame, wherein, in a way, the securing structure constitutes a cover for the receiving trough of the underbody structure.

7 Claims, 1 Drawing Sheet

(51) Int. Cl.
*B60R 13/08* (2006.01)
*B62D 29/04* (2006.01)

(58) Field of Classification Search
USPC .............................................. 296/181.2, 204
See application file for complete search history.

(56) References Cited

U.S. PATENT DOCUMENTS

| | | |
|---|---|---|
| 2005/0276970 A1 | 12/2005 | Busseuil et al. |
| 2008/0272625 A1 | 11/2008 | Paetz et al. |
| 2010/0209679 A1* | 8/2010 | Tompkins ............... B32B 5/028 428/201 |
| 2013/0076069 A1* | 3/2013 | Fuchs .................... B62D 21/02 296/181.2 |
| 2013/0168939 A1 | 7/2013 | Buschjohann et al. |
| 2014/0117654 A1 | 5/2014 | Buschjohann et al. |
| 2015/0042121 A1 | 2/2015 | Huang et al. |

FOREIGN PATENT DOCUMENTS

| | | |
|---|---|---|
| CN | 103287499 A | 9/2013 |
| DE | 32 42 604 A1 | 5/1984 |
| DE | 10 2004 001 523 A1 | 8/2005 |
| DE | 602 14 699 T2 | 9/2007 |
| DE | 20 2010 001 076 U1 | 6/2010 |
| DE | 10 2010 004 321 A1 | 7/2011 |
| DE | 10 2011 012 116 A1 | 11/2011 |
| DE | 10 2011 115 387 A1 | 5/2012 |
| DE | 10 2011 051 481 A1 | 1/2013 |
| DE | 20 2012 103 475 U1 | 2/2013 |
| DE | 10 2012 105 154 A1 | 12/2013 |
| EP | 0 794 106 A2 | 9/1997 |
| EP | 2 399 727 A1 | 12/2011 |
| WO | WO 97/12769 A2 | 4/1997 |
| WO | WO 00/66417 A1 | 11/2000 |
| WO | WO 2013/004209 A1 | 1/2013 |

OTHER PUBLICATIONS

International Search Report (PCT/ISA/210) issued in PCT Application No. PCT/EP2014/068260 dated Nov. 17, 2014 with English translation (five pages).
German-language Written Opinion (PCT/ISA/237) issued in PCT Application No. PCT/EP2014/068260 dated Nov. 17, 2014 (five pages).
German Search Report Issued in counterpart German Application No. 10 2013 218 725.4 dated May 12, 2014 with partial English translation (12 pages).

* cited by examiner

VEHICLE BODY HAVING AN UNDERBODY STRUCTURE AND AN AUXILIARY FRAME FASTENED THERETO

CROSS REFERENCE TO RELATED APPLICATIONS

This application is a continuation of PCT International Application No. PCT/EP2014/068260, filed Aug. 28, 2014, which claims priority under 35 U.S.C. § 119 from German Patent Application No. 10 2013 218 725.4, filed Sep. 18, 2013, the entire disclosures of which are herein expressly incorporated by reference.

BACKGROUND AND SUMMARY OF THE INVENTION

The invention relates to a vehicle body having an underbody structure and an auxiliary frame which is fastened to the latter and bears components of a wheel axle of the vehicle. With regard to the prior art, reference is made by way of example to DE 10 2011 051 481 A1, in addition to WO 00/66417.

Two-track motor vehicles customarily have axle supports (=auxiliary frame), to which the wheel-guiding links and/or further elements of the respective vehicle axle are fastened. A precise and defined guidance of the wheels with realization of special kinematic and elastokinematic variables is crucial here for a good driving performance of the vehicle. In the case of modern and high-quality axles, a large portion of the development work is focused on the optimum resolution of the conflict of objectives between traveling comfort and precise wheel guidance. An essential step here is the acoustic insulation of the structure-borne sound transmission between the wheels or a transmission mounted in the axle support and the body via rubber bearings (=elastomer bearings), preferably via a multiply elastic mounting. In physical terms, the jump from a structure, for example the underbody structure, to the elastomer material of the rubber bearing constitutes a massive jump in rigidity, and this large jump in impedance causes structure-borne sound reflection and therefore only a small portion of the sound energy is transmitted. The wheel-guiding links are mounted elastically with coordinated elastokinematics on the auxiliary frame and the auxiliary frame is customarily mounted elastically on the underbody structure of the vehicle in order to reduce the structure-borne sound transmission or to obtain a defined load introduction. According to the prior art, the rubber bearing/elastomer bearings are mostly screwed or pressed in in the form of rubber/metal connections.

In recent times, use has increasingly been made of fiber composite materials. Even in the case of such auxiliary frames for example of CFRP, the above-described function of the rubber bearings is required. The joining of rubber bearings (for example via screwing or pressing in) causes a punctiform introduction of force into the structure or underbody structure and direct screwing to or on a fiber composite matrix is mostly not possible because of the settling behavior. Use is therefore customarily made of inserts made from metal in order to realize screw connections and to permit force to be introduced into the fibers; the joining or connecting technique for the rubber bearings results in technically complicated constructions.

It is the object of the present invention to provide a measure for remedying the above described problems.

The achievement of this object, for a vehicle body having an underbody structure and an auxiliary frame which is fastened to the latter and bears components of a wheel axle of the vehicle, is characterized in that the auxiliary frame is connected to the underbody structure without the interconnection of elastomer bearings or the like via a plurality of adhesive beads. The adhesive beads are configured not only in respect of a connection which satisfies the mechanical requirements, but, in particular in respect of the thickness thereof, also with regard to acoustic insulation. The auxiliary frame is supported, with the interposition of an acoustic insulating layer, on a securing structure provided below the auxiliary frame, which securing structure is connected to the underbody structure non-positively or in an integrally bonded manner. Advantageous embodiments and developments are further described herein.

It is therefore proposed no longer to fasten a chassis auxiliary frame to the vehicle body or to the underbody structure thereof as customary via rubber bearings or the like by means of screws, but rather to adhesively bond the auxiliary frame to the underbody structure, wherein adhesive beads which are suitable and are sufficiently thick or high—in respect of a joining gap between the auxiliary frame and the underbody structure—are provided as an accumulation of a suitable adhesive. These adhesive beads not only produce the mechanical connection, but also represent the acoustic insulating function of the hitherto customary rubber bearings. Such adhesive beads can be designed in a similar manner to the adhesive beads for adhesively bonding windows in vehicle bodies, wherein use may be made of a similar adhesive material as in the adhesive bonding of windows, or of other suitable adhesive materials. The adhesive material which is used in the Applicant's production vehicle with the model designation "i3" for the adhesive bonding of the "drive module" (="undercarriage") to the "life module" (="vehicle body") may be mentioned as an example of another such adhesive material. However, according to the invention, the auxiliary frame is not fastened solely by use of adhesive beads between the auxiliary frame and the underbody structure, but rather an additional securing structure is provided, on which the auxiliary frame is downwardly supported, i.e. in proportion with the gravity thereof—namely in addition to the previously mentioned adhesive beads—with the interposition of an acoustic insulating layer which, furthermore, can likewise be designed in the form of one or more such adhesive beads. For safety reasons, the securing structure is fastened to the underbody structure of the vehicle body in an integrally bonded manner (for example by welding) and/or non-positively (preferably via screw connections).

In this connection, it should be expressly emphasized that the present invention is in no way restricted to the use of fiber-reinforced plastics for the body or underbody structure and/or the auxiliary frame; on the contrary, each of the components or parts can also be formed by suitable metallic materials. A mixed construction of the individual parts is optionally also possible in such a manner that at least one of the contact surfaces of the auxiliary frame or of the underbody structure is formed by fiber-reinforced plastic with an adhesive bead.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 2:
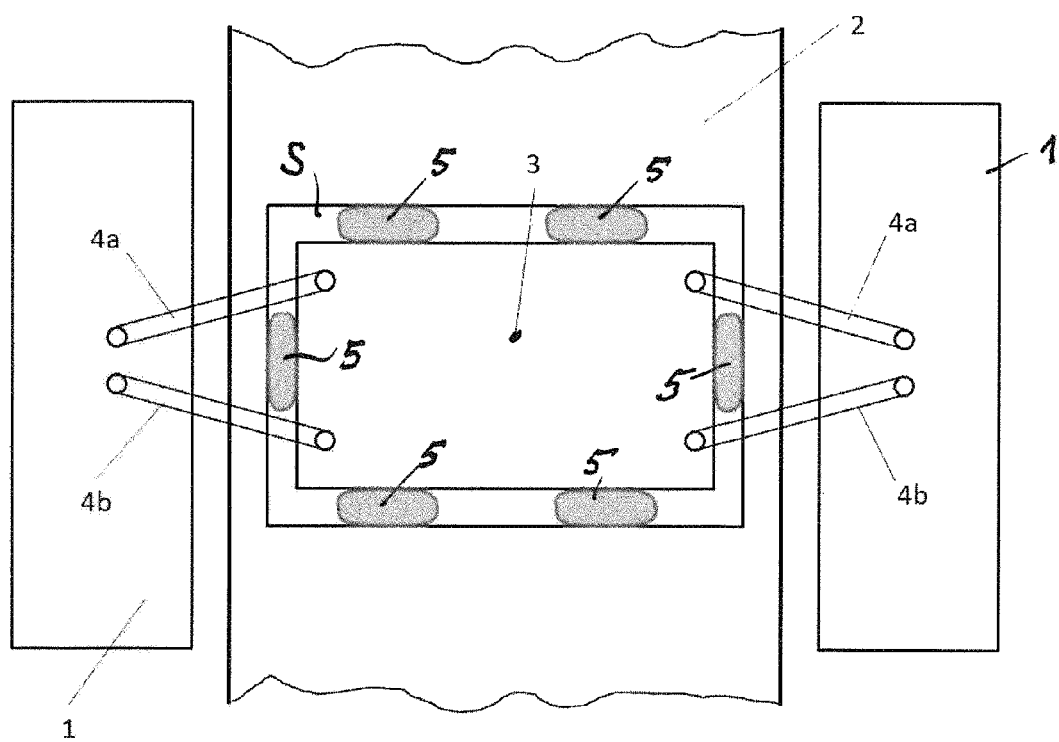
FIG. 2 is a section view A-A taken from FIG. 1 (and therefore a section in a horizontal plane).

The reference number 1 indicates a wheel of the vehicle, of which vehicle a part of the underbody structure 2 is furthermore illustrated in the region of the wheel. The underbody structure 2, for its part, is part of the vehicle body. An auxiliary frame 3, which is also referred to as axle support 3, is fastened to the underbody support 2. As FIG. 2 shows, two links 4a, 4b are coupled to the auxiliary frame 3 (only illustrated figuratively here), the respectively other end of the links guiding the wheel 1 as customary via a wheel support (not illustrated).

Figure 1:
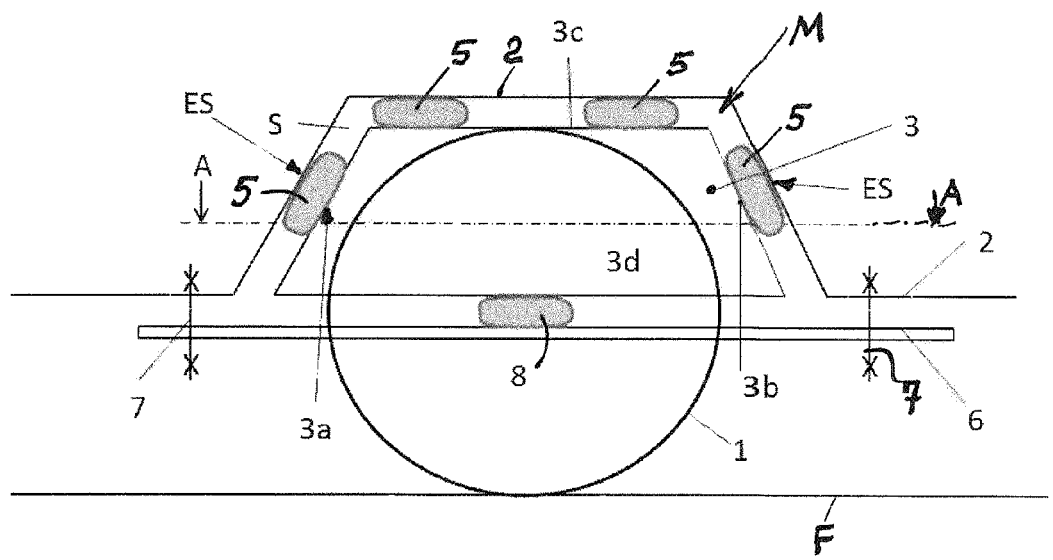
FIG. 1 is an abstract, section view, in a vertical plane running parallel to the longitudinal axis of the vehicle of an underbody structure according to an embodiment of the invention of a vehicle body having an auxiliary frame fastened thereto.

As can be seen in FIG. 1, the underbody structure 2 is designed in the manner of a trough in the receiving region of the auxiliary frame 3 and with insert slopes ES for the auxiliary frame, i.e. the underbody structure 2 forms a trough M which is open downward (with respect to the roadway F) and into which the auxiliary frame 3 is inserted from below, i.e. from the roadway F. The lateral structure of the auxiliary frame (or the walls 3a, 3b of same) are adapted to the insert slopes ES of the underbody structure 2. The base 3c of the auxiliary frame 3, which base is at the top of FIG. 1 and is horizontal here, is adapted to the horizontal base of the trough M. This is done in such a manner that, in the completely inserted state, there is a small joining gap S between the walls 3a, 3b and the upper base 3c of the auxiliary frame 3, which here in greatly abstracted form describes a truncated pyramid with a respectively rectangular lower base (3d) and upper base 3c, and the trough M in the underbody structure 2. A plurality of adhesive beads 5 composed of an adhesive, via which the auxiliary frame 3 is connected to the underbody structure 2 by adhesive bonding, are located in sections in the joining gap S. The adhesive beads 5 are designed not only in respect of a connection which satisfies the mechanical requirements, but in particular in respect of the thickness thereof—and therefore the height of the joining gap S—also with regard to acoustic insulation between the auxiliary frame 3 and the underbody structure 2.

In addition to the adhesive connection via the adhesive beads 5, which have been explained to this extent, the auxiliary frame 3 is supported on a securing structure 6, which is provided therebelow with the interposition of an acoustic insulating layer 8. The securing structure 6 is connected to the underbody structure 2 non-positively, namely via a plurality of screw connections 7 (only illustrated in abstract form), here. The securing structure 6, which is designed here in the form of a flat metal sheet or the like, virtually constitutes a cover for the receiving trough M of the underbody structure 2.

The connection of two or more structural components in the form of at least one underbody structure 2 and an axle support or auxiliary frame 3 via a soft adhesive is basically proposed here for a vehicle, wherein those portions of the structures which are adhesively bonded to one another and the adhesive material together virtually form a rubber bearing, at any rate in respect of the acoustic insulation between the auxiliary frame 3 and the underbody structure 2. The required rigidities in all of the co-ordinate directions and the required torsional rigidities can be provided by the shape and suitable arrangement of the adhesive beads 5. In addition, a safety-relevant support via the securing structure 6, which, of course, may also be designed in the manner of a bow or in some other way, is ensured.

In a physical structure, a multiplicity of details are generally designed differently from the illustration of the figures without departing from the content of the patent claims. However, the advantages mentioned below are always afforded when the essential features are realized, namely the omission of rubber bearings which are otherwise required, an extensive introduction of force in particular into fiber composite structures, no complicated connecting elements, a reduction in weight and the possibility of providing virtually "rubber bearing variants" by means of modified adhesive beads, adhesive properties and joining gaps S.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle body, comprising:
   an underbody structure;
   an auxiliary frame fastened to the underbody structure, the auxiliary frame being configured to support components of a wheel axle of the vehicle;
   a plurality of adhesive beads connecting the auxiliary frame to the underbody structure without utilizing interconnecting elastomer bearings, wherein the plurality of adhesive beads are configured to satisfy mechanical requirements of the vehicle body and, based on a thickness of the plurality of adhesive beads, acoustic insulation requirements; and
   a securing structure arranged below the auxiliary frame, wherein the auxiliary frame is supported on the securing structure with an interposed acoustic insulating layer, and further wherein the securing structure is connected to the underbody structure in an integrally bonded or non-positively connected manner.

2. A vehicle body, comprising:
   an underbody structure;
   an auxiliary frame fastened to the underbody structure, the auxiliary frame being configured to support components of a wheel axle of the vehicle;
   a plurality of adhesive beads connecting the auxiliary frame to the underbody structure without utilizing interconnecting elastomer bearings, wherein the plurality of adhesive beads are configured to satisfy mechanical requirements of the vehicle body and, based on a thickness of the plurality of adhesive beads, acoustic insulation requirements; and
   a securing structure arranged below the auxiliary frame, wherein the auxiliary frame is supported on the securing structure with an interposed acoustic insulating layer, and further wherein the securing structure is connected to the underbody structure in an integrally bonded or non-positively connected manner,
   wherein the underbody structure has a receiving region for the auxiliary frame configured in a trough shape with insert slopes corresponding to the auxiliary frame.

3. The vehicle body according to claim 2, wherein the securing structure provides a cover for the trough-shape of the underbody structure.

4. The vehicle body according to claim 3, wherein the acoustic insulating layer between the auxiliary frame and the securing structure is in a form of at least one adhesive bead.

5. A vehicle body, comprising:
an underbody structure;
an auxiliary frame fastened to the underbody structure, the auxiliary frame being configured to support components of a wheel axle of the vehicle;
a plurality of adhesive beads connecting the auxiliary frame to the underbody structure without utilizing interconnecting elastomer bearings, wherein the plurality of adhesive beads are configured to satisfy mechanical requirements of the vehicle body and, based on a thickness of the plurality of adhesive beads, acoustic insulation requirements; and
a securing structure arranged below the auxiliary frame, wherein the auxiliary frame is supported on the securing structure with an interposed acoustic insulating layer, and further wherein the securing structure is connected to the underbody structure in an integrally bonded or non-positively connected manner,
wherein the acoustic insulating layer between the auxiliary frame and the securing structure is in a form of at least one adhesive bead.

6. The vehicle body according to claim 4, wherein at least one of the contact surfaces of the auxiliary frame or the underbody structure is a fiber-reinforced plastic with an adhesive bead.

7. The vehicle body according to claim 1, wherein at least one of the contact surfaces of the auxiliary frame or the underbody structure is a fiber-reinforced plastic with an adhesive bead.

* * * * *